(12) United States Patent
Rieger

(10) Patent No.: US 8,342,048 B2
(45) Date of Patent: Jan. 1, 2013

(54) DUAL CLUTCH TRANSMISSION

(75) Inventor: Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 404 days.

(21) Appl. No.: 12/681,910

(22) PCT Filed: Oct. 8, 2008

(86) PCT No.: PCT/EP2008/063424
§ 371 (c)(1),
(2), (4) Date: Apr. 7, 2010

(87) PCT Pub. No.: WO2009/050072
PCT Pub. Date: Apr. 23, 2009

(65) Prior Publication Data
US 2010/0218627 A1    Sep. 2, 2010

(30) Foreign Application Priority Data

Oct. 15, 2007 (DE) .......................... 10 2007 049 270

(51) Int. Cl.
*F16H 3/08* (2006.01)
(52) U.S. Cl. ......................................................... 74/330
(58) Field of Classification Search .................... 74/330, 74/333, 340
See application file for complete search history.

(56) References Cited

U.S. PATENT DOCUMENTS

| | | | |
|---|---|---|---|
| 6,244,123 B1 | 6/2001 | Hegerath et al. | |
| 6,869,379 B2 * | 3/2005 | Voss et al. | 475/218 |
| 7,066,043 B2 * | 6/2006 | Kim et al. | 74/330 |
| 7,225,696 B2 * | 6/2007 | Gitt | 74/340 |
| 7,246,536 B2 | 7/2007 | Baldwin | |
| 7,287,442 B2 | 10/2007 | Gumpoltsberger | |
| 7,597,644 B2 * | 10/2009 | Rodgers, II | 475/218 |
| 7,604,561 B2 * | 10/2009 | Earhart | 475/218 |
| 7,604,565 B2 * | 10/2009 | Lee et al. | 477/3 |
| 8,051,732 B2 * | 11/2011 | Gitt | 74/331 |
| 2006/0054441 A1 | 3/2006 | Ruedle | |
| 2009/0036247 A1 * | 2/2009 | Earhart et al. | 475/35 |

FOREIGN PATENT DOCUMENTS

DE    38 22 330 A1    7/1989

(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de Mar. 2007.

*Primary Examiner* — Ha D. Ho

(74) *Attorney, Agent, or Firm* — Davis & Bujold, PLLC

(57) ABSTRACT

A dual-clutch transmission comprising clutches with input sides coupled to an input shaft and output sides respectively coupled to first and second transmission input shafts, countershafts on which toothed idler gearwheels are mounted to rotate, toothed fixed gearwheels are coupled to the first and the second transmission input shafts and engage the idler gearwheels, coupling devices connect the idler gearwheel to one of the countershafts, drive output gearwheels are fixed to countershafts and drive an output shaft, and a shifting element couples the input shafts, such that eight forward gears and at least one reverse gear can be engaged. Five wheel planes are arranged in the transmission such that at least one winding gear can be engaged by the shifting element.

40 Claims, 2 Drawing Sheets

FOREIGN PATENT DOCUMENTS

| | | |
|---|---|---|
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

DUAL CLUTCH TRANSMISSION

This application is a National Stage completion of PCT/EP2008/063424 filed Oct. 8, 2008, which claims priority from German patent application serial no. 10 2007 049 270.9 filed Oct. 15, 2007.

FIELD OF THE INVENTION

The present invention concerns a dual clutch transmission for a vehicle.

BACKGROUND OF THE INVENTION

From the document DE 103 05 241 A1 a six-gear or seven-gear dual clutch transmission is known. The dual clutch transmission has two clutches, each connected on its input side to the drive input shaft and on its output side to one of the two respective transmission input shafts. The two transmission input shafts are arranged coaxially with one another. Further, two countershafts are arranged axis-parallel to the two transmission input shafts, whose idler gearwheels mesh with fixed gearwheels of the transmission input shafts. Moreover, coupling devices are held in a rotationally fixed manner but able to move axially on the countershafts, in order to be able to shift the respective gearwheels of the gears. The transmission ratio in each case is transmitted by the drive output gearwheels to a differential gearbox. To produce the desired transmission ratio steps with the known dual clutch transmissions a substantial number of wheel planes are required, so that the structural space required for installing them is not inconsiderable.

Further, from the document DE 38 22 330 A1 a spur gear variable-speed transmission is known. The spur gear variable-speed transmission comprises a dual clutch that can be shifted under load, one part of which is connected to a drive input shaft and the other part is connected with a hollow drive input shaft mounted to rotate on the drive input shaft. For certain transmission ratios the drive input shaft can be coupled to the hollow drive input shaft by means of a shifting element.

From the document DE 10 2004 001 961 A1 a shift-under-load transmission with two clutches is known, each of which is associated with a part-transmission. The transmission input shafts of the two part-transmissions are arranged coaxially with one another and are engaged via fixed gearwheels with idler gearwheels of the associated countershafts. The respective idler gearwheels of the countershafts can be connected in a rotationally fixed manner to their countershafts by means of associated shifting elements. From that document a dual clutch transmission is known, which absolutely requires six wheel planes in the two part-transmissions. This increases the structural space it occupies the axial direction, which considerably restricts the installation possibilities of the known transmission.

SUMMARY OF THE INVENTION

The purpose of the present invention is to propose a dual clutch transmission of the type described at the start, with which on the one hand the shift-under-load transmission ratio steps can be produced with the least possible need for structural space, and on the other hand such that the transmission contains as few components as possible in order to keep the production costs of the transmission low.

Thus, a dual clutch transmission with only five wheel planes in the part-transmissions is produced, such that to enable winding gears the two part-transmissions can be coupled by means of the at least one additional shifting element. In this way, in the proposed dual clutch transmission a maximum number of transmission ratios can be produced with the fewest possible wheel planes, preferably such that all the forward gears and reverse gears can be shifted under load in sequence.

In the case of a winding gear, gearwheels of gears in the two part-transmissions are coupled with one another in order to produce a force flow through both part-transmissions. The shifting element used in each such case serves to couple two idler gearwheels and thereby brings the transmission input shafts into relationship with one another. Regardless of the embodiment variant of the dual clutch transmission concerned, the arrangement of the shifting element for coupling two particular idler gearwheels can be varied, so the shifting element does not necessarily have to be arranged between the idler gearwheels to be coupled.

Thanks to the small number of wheel planes required, the axial length of the proposed transmission is short, whereby even front transverse mounting in vehicles is made possible. Since the dual clutch transmission according to the invention also contains winding gears and by virtue of its three-shaft configuration, multiple uses of individual wheel pairs or wheels are enabled, which leads to a saving of components in the transmission.

In the dual clutch transmission according to the invention so-termed dual wheel planes and/or single wheel planes can be provided. In a dual wheel plane, a respective idler gearwheel of each of the countershafts is associated with a fixed gearwheel of one of the transmission input shafts. In contrast, in a single wheel plane only one idler gearwheel of one countershaft is associated with a fixed gearwheel of one of the transmission input shafts. Since in each dual wheel plane at least one idler gearwheel can be used for at least two gears, owing to this possible multiple use of idler gearwheels, a given number of transmission ratios can be produced with fewer wheel planes. Thus, the structural length of the transmission is reduced.

Thanks to the use of single wheel planes in which only one idler gearwheel of one countershaft is associated with the fixed gearwheel of the associated transmission input shaft, there is a free alternative transmission ratio.

The winding gears can be produced by means of a plurality of wheel pairs or wheel planes, so that other gears can be shifted by means of the individual wheel pairs or wheel planes of the winding gears. In addition, the proposed transmission has a large degree of freedom in relation to the range of transmission ratios and the transmission steps that can be realized.

The proposed wheel planes give a gearset arrangement in the dual clutch transmission according to the invention, which produces at least eight forward transmission ratios and a number of reverse transmission ratios, such that at least one winding gear can be realized in the first gear step and in at least one of the reverse gears. In addition, further winding gears can be engaged as the second to the eighth gear or even as reverse gears, and the eighth gear can be shifted under load as a function of the seventh gear. In a sequential design all the forward gears and reverse gears should be able to shift under load. Winding gears that cannot be shifted under load can be provided as intermediate gears whose transmission ratio is in each case between the transmission ratios of two main driving gears, as overdrives or over-speed gears in which the transmission ratio is in each case smaller than the lowest transmission ratio of the main driving gear (6th gear), as off-road gears or as crawling gears in which the transmission ratio is in each case larger than the transmission ratio of the first gears, and/or as further reverse gears.

In the dual clutch transmission according to the invention the load-shiftable reverse gears are produced by only one additional meshing engagement or only one additional gearwheel, such that at least by virtue of the additional, rotational direction reversing gearwheel step a reverse gear can be produced as a winding gear and another reverse gear can be produced directly by the gearwheel step. The transmission ratios of the reverse gears can be varied, for example by means of an additional step wheel or suchlike.

In an embodiment variant of the present invention, it can be provided that the five wheel planes are realized for example by eight gearwheel pairs. For example, at least three fixed gearwheels can be arranged on the first transmission input shaft and at least two fixed gearwheels on the second transmission input shaft, which mesh for example with five idler gearwheels of the first, and with three idler gearwheels of the second countershaft. Other designs are also conceivable for producing the five wheel planes.

The additional shifting element for coupling the part-transmissions can for example be arranged on the first countershaft, for example between the second and the third wheel planes.

Thus, in this embodiment variant of the dual clutch transmission according to the invention there are at least eight load-shifting forward gears and two reverse gears, with at least the first gear being in the form of a winding gear and in addition the second reverse gear formed as a winding gear. The first reverse gear is engaged by the same clutch as the first forward gear. Thus, additional shifts-under-load are possible between the second forward gear and the first reverse gear. The heavily loaded gears, such as the first and second forward gears and the first and second reverse gears, are powered by the second countershaft. In this embodiment variant the winding gears can be produced both forward and in reverse by the same gearwheel pair.

In a related embodiment variant five wheel planes can be provided by means of nine gearwheel pairs, the total of five fixed gearwheels on the transmission input shafts meshing, for example, with four idler gearwheels of the first countershaft and with five idler gearwheels of the second countershaft. This gearset arrangement enables a progressive gear gradation and two reverse gears that can be engaged as winding gears, the first reverse gear being engaged by the same clutch as the first forward gear. Thus, the further reverse gear is designed for shifting under load to the first forward gear. The heavily loaded gears, such as the first and second forward and the first and second reverse gears, can be powered by the second countershaft. In this embodiment variant too the winding gears can also be produced by the same gearwheel pair.

To connect the idler gearwheels in a rotationally fixed manner to their respective countershafts for the individual transmission ratio steps, for example on each countershaft at least one dual action coupling device is provided, and in addition at least one single action coupling device can also be arranged on each countershaft. As coupling devices hydraulically actuated clutches or even interlocking claw-type clutches and any type of synchronizers can be used.

The additional shifting element for coupling the part-transmissions can for example be arranged on the first countershaft between the second and third wheel planes. Other possible arrangements are also conceivable and further shifting elements can be used. With the shifting elements the two transmission input shafts are coupled by tooth engagement such that the transmission input shafts are brought into relationship.

It is conceivable to vary the possible arrangements indicated and also the number of toothed gearwheels and the number of coupling devices to realize still more load-shifting or non load-shifting gears in a manner that saves both structural space and components in the proposed dual clutch transmission. In addition, the respective arrangement positions of the coupling devices on the wheel planes can be varied. Furthermore, the action direction of the coupling devices can be changed or extended. A dual action coupling device can also be replaced by two single action coupling devices, and vice-versa.

Regardless of the respective embodiment variant of the dual clutch transmission, the drive input shaft and the drive output shaft can preferably not be arranged coaxially with one another, whereby a particularly space-saving arrangement is produced. For example the shafts accordingly spatially arranged one behind the other can also be slightly offset relative to one another. With this arrangement a direct gear with a transmission ratio equal to one can be realized by meshing, and can advantageously be positioned relatively freely on the sixth, seventh or eighth gear. Other possible arrangements of the drive input and drive output shafts are also conceivable.

Preferably, the proposed dual clutch transmission is equipped with an integrated drive output stage. As the drive output gear, the output stage can comprise a fixed gearwheel on the output shaft, which meshes both with a fixed gearwheel of the first countershaft and with a fixed gearwheel of the second countershaft.

Advantageously, the lower forward gears and the reverse gears can be actuated by a starting or shifting clutch so as to concentrate higher loads on the clutch, thereby allowing the second clutch to be made more compactly and inexpensively. In particular, the wheel planes in the proposed dual clutch transmission can be so arranged that starting can be carried out either via the inner transmission input shaft or via the outer transmission input shaft and thus by means of whichever clutch is best suited, which is also possible with a concentrically arranged, radially nested configuration of the dual clutch one inside the other. For that purpose the wheel planes can be arranged correspondingly mirror-symmetrically or exchanged. It is also possible for the countershafts to be arranged the other way around or mirror-symmetrically.

BRIEF DESCRIPTION OF THE DRAWINGS

Below, the invention is explained in greater detail with reference to the drawing, which shows.

DETAILED DESCRIPTIONS OF THE PREFERRED EMBODIMENTS

Figures 1, 1A:
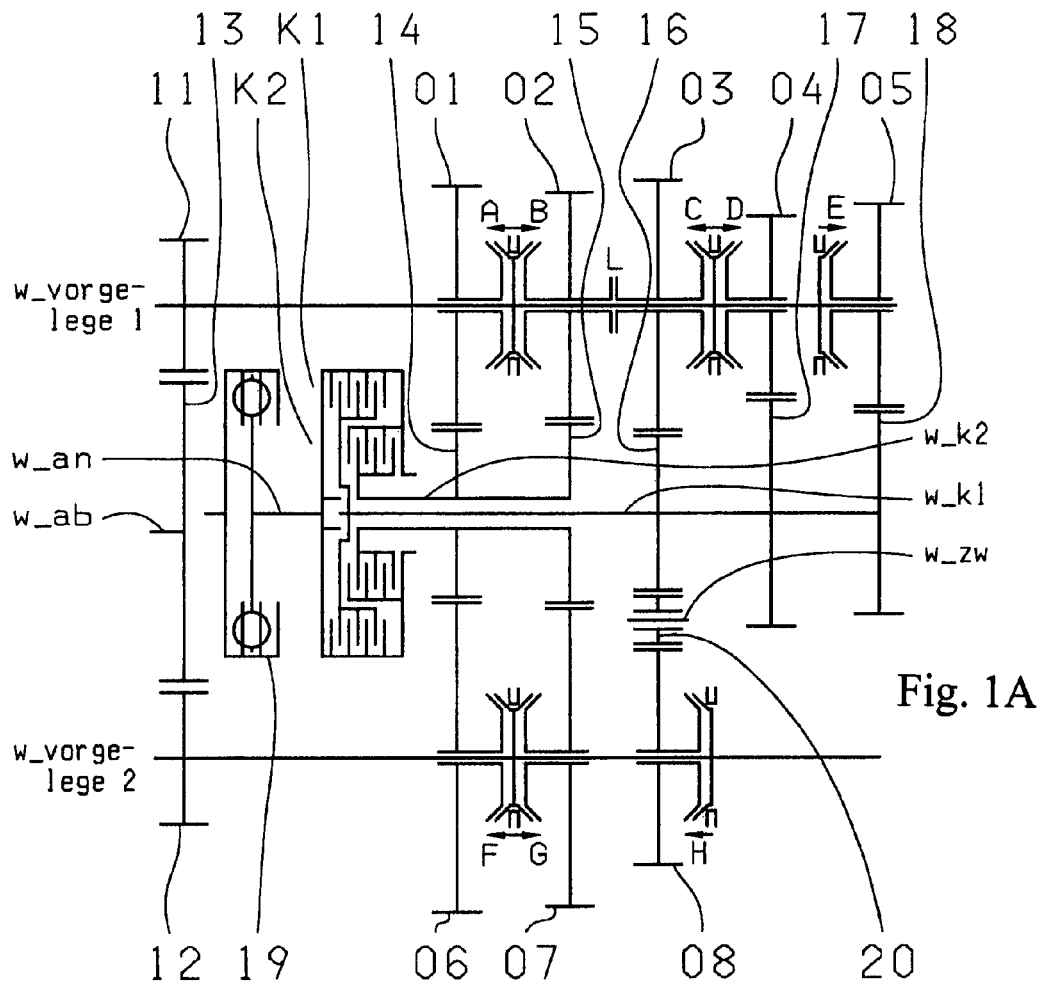
FIGS. 1, 1A: Diagrammatic view of a first embodiment of an eight-gear dual clutch transmission, and an example shifting scheme.

The eight-gear dual clutch transmission according to the invention comprises two clutches K1, K2 whose input sides are connected to a drive input shaft w_an. In addition, a torsional vibration damper 19 can be arranged on the driveshaft w_an. The output sides of the clutches K1, K2 are respectively connected to one of two transmission input shafts w_K1, w_K2 arranged coaxially with one another. The first transmission input shaft w_K1 is a solid shaft and the second transmission input shaft w_K2 is a hollow shaft. Furthermore, two countershafts w_vorgelege1, w_vorgelege2 are provided, which are arranged axis-parallel to one another. The two transmission input shafts w_K1 and w_K2 are coupled by a shifting element L with meshing teeth, so that the transmission input shafts w_K1 and w_K2 are brought into relationship.

In the eight-gear dual clutch transmission according to the invention only five wheel planes are provided. In the first embodiment variant according to FIG. 1A the five wheel planes 01-06, 02-07, 03-08, 04-17 05-18 are formed by two fixed gearwheels 14, 15 on the second transmission input shaft w_K2 and by three fixed gearwheels 16, 17, 18 on the first transmission input shaft w_K1, which mesh with five idler gearwheels 01, 02, 03, 04, 05 on the first countershaft w_vorgelege1 and with three idler gearwheels 06, 07, 08 on the second countershaft w_vorgelege2.

According to the first embodiment variant shown in FIG. 1A, the first, second and third wheel planes, 01-06, 02-07 and 03-08 respectively, are made as dual wheel planes. In contrast, the fourth and fifth wheel planes 04-17 and 05-18 respectively are each single wheel planes.

In the first wheel plane 01-06 the fixed gearwheel 14 of the second transmission input shaft w_K2 meshes both with the idler gearwheel 01 of the first countershaft w_vorgelege1 and with the idler gearwheel 06 of the second countershaft w_vorgelege2. The second wheel plane 02-07 contains the fixed gearwheel 15 of the second transmission input shaft w_K2, which meshes both with the idler gearwheel 02 of the first countershaft w_vorgelege1 and with the idler gearwheel 07 of the second countershaft w_vorgelege2.

The third wheel plane 03-08 contains the fixed gearwheel 16 of the first transmission input shaft w_K1, which meshes with the idler gearwheel 03 of the first countershaft w_vorgelege1. In addition, an idler gearwheel 20 on an intermediate shaft w_zw meshes both with the fixed gearwheel 16 of the first transmission input shaft w_K1 and with the idler gearwheel 08 of the second countershaft w_vorgelege2. In this way a reverse of the rotational direction can be provided in order to produce the reverse gears R1 and R2. The idler gearwheel 20 can also be made as a step wheel. To reverse the rotational direction, the idler gearwheel 03 of the first countershaft w_vorgelege1 can also mesh with the idler gearwheel 08 of the second countershaft w_vorgelege2, in which case there is no need for the idler gearwheel 20.

In the fourth wheel plane 04-17 the fixed gearwheel 17 of the first transmission input shaft w_K1 meshes only with the idler gearwheel 04 of the first countershaft w_vorgelege1. Likewise, in the fifth wheel plane 05-18 the fixed gearwheel 18 of the first transmission input shaft w_K1 meshes only with the idler gearwheel 05 of the first countershaft w_vorgelege1. This gives the advantage of a greater alternative of transmission ratios compared with wheel planes in which idler gearwheels mesh on both sides of the fixed gearwheel.

With this proposed gearset arrangement a dual action coupling device A-B is arranged on the first countershaft w_vorgelege1 between the first wheel plane 01-06 and the second wheel plane 02-07. In addition, a dual action coupling device C-D is provided on the first countershaft w_vorgelege1 between the third and fourth wheel planes 03-08 and 04-17. Moreover, on the first countershaft w_vorgelege1 a single action coupling device E is provided on the side of the fifth wheel plane 05-18 facing toward the clutches K1, K2. On the second countershaft w_vorgelege2 a dual action coupling device F-G is arranged between the first and second wheel planes 01-06 and 02-07. In addition, on the second countershaft w_vorgelege2 a single action coupling device H is provided on the side of the third wheel plane 03-08 facing away from the clutches K1, K2.

To produce winding gears as well, i.e. to couple the two part-transmissions with one another, an additional shifting element L is arranged on the first countershaft w_vorgelege1 between the second wheel plane 02-07 and the third wheel plane 03-08.

The table in FIG. 1 shows an example shifting scheme for the first embodiment variant of the eight-gear dual clutch transmission.

According to the shifting scheme shown in FIG. 1, the first forward gear 1 is engaged as a winding gear by means of the first clutch K1, the coupling device F-G pushed in the G direction and the activated shifting element L. The second forward gear 2 is produced by the second clutch K2 and the coupling device F-G pushed in the G direction, and the third forward gear 3 is engaged by the first clutch K1 and the coupling device C-D pushed in the C direction. The fourth forward gear 4 is again engaged by means of the second clutch K2 and the coupling device A-B pushed in the B direction, and the fifth forward gear 5 is produced by the first clutch K1 and the coupling device E of the first countershaft w_vorgelege1 pushed in the E direction. The sixth forward gear 6 is engaged by the second clutch K2 and the coupling device F-G pushed in the F direction, and the seventh forward gear 7 by the first clutch K1 and the coupling device C-D pushed in the D direction. Finally, the eighth forward gear 8 is engaged by the second clutch K2 and the coupling device A-B pushed in the A direction.

The first reverse gear R1 is engaged by means of the first clutch K1 and the coupling device H on the second countershaft w_vorgelege2 pushed in the H direction. The second reverse gear R2 is engaged as a winding gear by the second clutch K2, the coupling device H on the second countershaft w_vorgelege2 pushed in the H direction and the activated shifting element L.

Accordingly, as a winding gear the first forward gear 1 uses the toothed gearwheels 16, 03, 02, 15, 07 and 12. In the second forward gear 2 the gearwheels 15, 07 and 12 are used, and to produce the third forward gear 3 the gearwheels 16, 03 and 11 are used. In the fourth forward gear 4 the gearwheels 15, 02 and 11 are used, and in the fifth forward gear 5 the gearwheels 18, 05 and 11 are used. The sixth forward gear 6 uses the gearwheels 14, 06 and 12. The seventh forward gear 7 uses the gearwheels 17, 04 and 11. Finally, the eighth forward gear 8 uses the gearwheels 14, 01 and 11. In the first reverse gear R1 the gearwheels 16, 20, 08 and 12 are used. The second reverse gear R2, as a winding gear, uses the gearwheels 15, 02, 03, 16, 20, 08 and 12.

With this embodiment variant, however, other allocations of the individual gear steps in relation to the clutches are also possible. In particular, for example, a converse allocation can be produced in the simplest manner by mirror-imaging.

Figures 2, 2A:
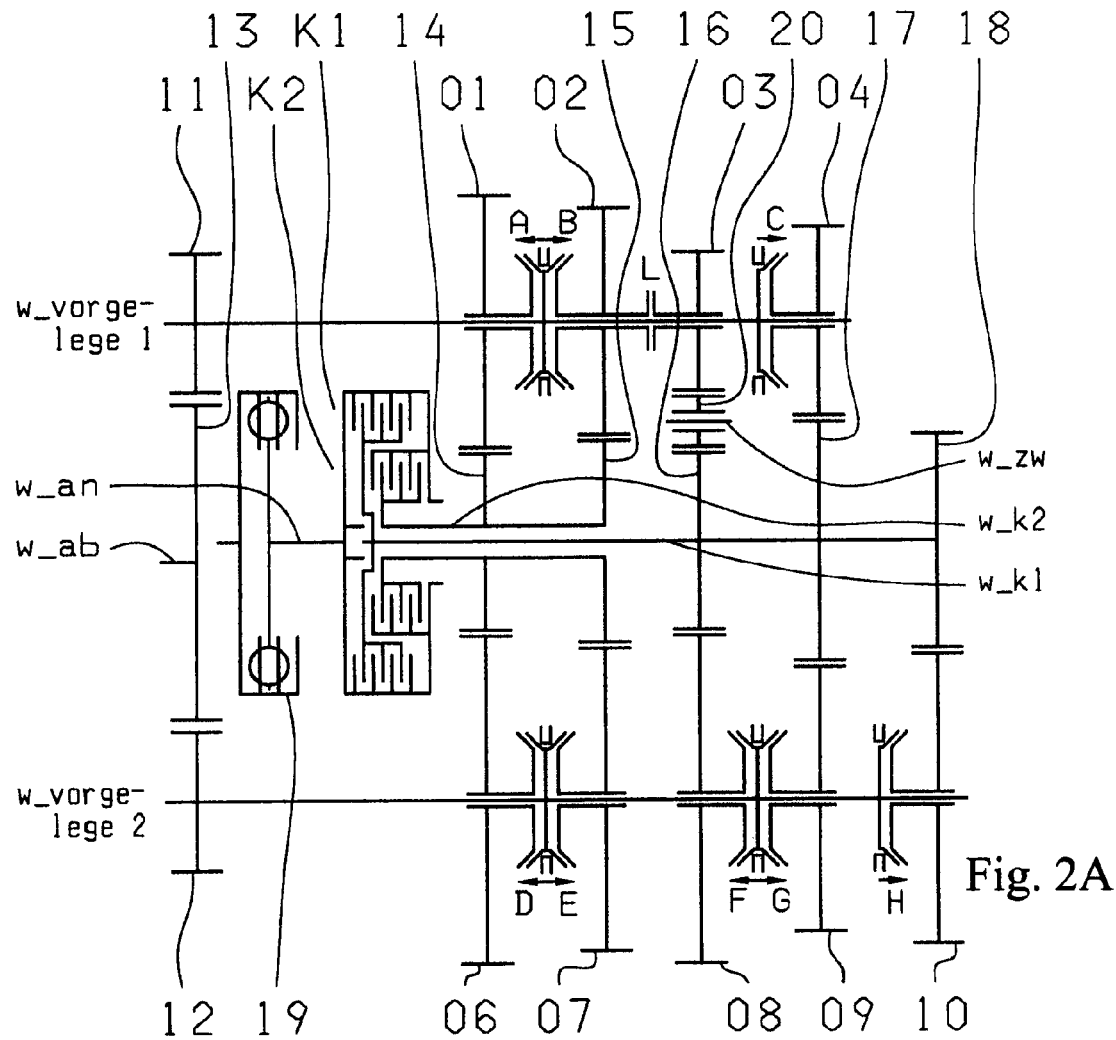
FIGS. 2, 2A: Diagrammatic view of a second embodiment variant of the eight-gear dual clutch transmission according to the invention, and an example shifting scheme.

In the second embodiment variant shown in FIG. 2A, the five wheel planes 01-06, 02-07, 03-08, 04-09 18-10 are formed by two fixed gearwheels 14, 15 of the second transmission input shaft w_K2 and three fixed gearwheels 16, 17, 18 of the first transmission input shaft w_K1, which mesh with four idler gearwheels 01, 02, 03, 04 of the first countershaft w_vorgelege1 and with five idler gearwheels 06, 07, 08, 09, 10 of the second countershaft w_vorgelege2.

According to the embodiment variant shown in FIG. 2A, the first, second, third and fourth wheel planes, 01-06, 02-07,

03-08 and 04-09 respectively, are all formed as dual wheel planes. In contrast, the fifth wheel plane 18-10 is a single wheel plane.

In the first wheel plane 01-06 the fixed gearwheel 14 of the second transmission input shaft w_K2 meshes both with the idler gearwheel 01 of the first countershaft w_vorgelege1 and with the idler gearwheel 06 of the second countershaft w_vorgelege2. The second wheel plane 02-07 contains the fixed gearwheel 15 of the second transmission input shaft w_K2, which meshes both with the idler gearwheel 02 of the first countershaft w_vorgelege1 and with the idler gearwheel 07 of the second countershaft w_vorgelege2.

The third wheel plane 03-08 contains the fixed gearwheel 16 of the first transmission input shaft w_K1, which meshes with the idler gearwheel 08 of the second countershaft w_vorgelege2. In addition, an idler gearwheel 20 arranged on an intermediate shaft w_zw meshes both with the fixed gearwheel 16 of the first transmission input shaft w_K1 and with the idler gearwheel 03 of the first countershaft w_vorgelege1. In this way a reverse of the rotational direction for producing the reverse gears R1 and R2 can be provided. The idler gearwheel 20 can also be made as a step wheel. For the reversal of the rotational direction the idler gearwheel 03 of the first countershaft w_vorgelege1 can also mesh with the idler gearwheel of the second countershaft w_vorgelege2, and there is then no need for the idler gearwheel 20.

In the fourth wheel plane 04-09 the fixed gearwheel 17 of the first transmission input shaft w_K1 meshes both with the idler gearwheel 04 of the first countershaft w_vorgelege1 and with the idler gearwheel 09 of the second countershaft w_vorgelege2.

Finally, the fifth wheel plane 18-10 contains the fixed gearwheel 18 of the first transmission input shaft w_K1, which meshes only with the idler gearwheel 10 of the second countershaft w_vorgelege2. This gives the advantage of a greater alternative transmission ratio compared with wheel planes in which idler gearwheels mesh with the fixed gearwheel on both sides.

In this proposed gearset arrangement, on each of the countershafts w_vorgelege1 and w_vorgelege2 dual action coupling devices A-B and D-E respectively are provided between the first wheel plane 01-06 and the second wheel plane 02-07. In addition, on the side of the fourth wheel plane 04-09 facing toward the clutches K1, K2 a single action coupling device C is provided on the first countershaft w_vorgelege1.

On the second countershaft w_vorgelege2 a dual action coupling device F-G is arranged between the third and fourth wheel planes 03-08 and 04-09. In addition, on the second countershaft w_vorgelege2 a single action coupling device H is arranged on the side of the fifth wheel plane 18-10 facing toward the clutches K1, K2.

To produce winding gears as well, i.e. to couple the two part-transmissions to one another, as in the first embodiment variant the additional shifting element L is arranged on the first countershaft w_vorgelege1 between the second and third wheel planes 02-07 and 03-08 respectively.

The table in FIG. 2 shows an example shifting scheme for the second embodiment variant of the eight-gear dual clutch transmission.

According to the shifting scheme in FIG. 2, the first forward gear 1 is engaged by means of the first clutch K1 and the coupling device F-G pushed in the F direction. The second forward gear 2 is produced by the second clutch K2 and the coupling device D-E pushed in the E direction. The third forward gear 3 is engaged by the first clutch K1 and the coupling device H on the second countershaft w_vorgelege2. The fourth forward gear 4 is engaged, again, by the second clutch K2 and the coupling device A-B pushed in the B direction, and the fifth forward gear 5 by the first clutch K1 and the coupling device F-G pushed in the G direction. The sixth forward gear 6 is engaged by the second clutch K2 and the coupling device D-E pushed in the D direction, and the seventh forward gear 7 again by the first clutch K1 and the coupling device C on the first countershaft w_vorgelege1. Finally, the eighth forward gear 8 is engaged by means of the second clutch K2 and the coupling device A-B pushed in the A direction.

The first reverse gear R1 is engaged as a winding gear by means of the first clutch K1, the coupling device D-E pushed in the E direction and the activated shifting element L. The second reverse gear R2 is engaged as a winding gear by the second clutch K2, the coupling device F-G pushed in the F direction and the shifting element L.

Accordingly, the first forward gear 1 uses the toothed gearwheels 16, 08 and 12. The second forward gear 2 uses the gearwheels 15, 07 and 12, and the third forward gear 3 uses the gearwheels 18, 10 and 12. For the fourth forward gear 4 the gearwheels 15, 02 and 11 are used, for the fifth forward gear 5 the gearwheels 17, 09 and 12, and for the sixth forward gear 6 the gearwheels 14, 06 and 12 are used. Finally, the seventh forward gear 7 uses the gearwheels 17, 04 and 11 and the eighth forward gear 8 uses the gearwheels 14, 01 and 11.

In the first reverse gear R1, as a winding gear, the gearwheels 16, 20, 03, 02, 15 07 and 12 are used. and in the second reverse gear R2, which is also a winding gear, the gearwheels 15, 02, 03, 20, 16, 08 and 12 are used.

In this embodiment variant, however, other allocations of the individual gear steps in relation to the clutches are also possible. In particular for example, a converse allocation can be realized in the simplest manner by mirror reflection.

In the embodiment variants described above, the direction indicated in each case, in which the coupling devices have to be pushed in order to connect a desired idler gearwheel with the countershaft concerned, can be changed by modifying the coupling devices, for example with appropriate reversing elements.

INDEXES

01 Idler gearwheel of the first countershaft
02 Idler gearwheel of the first countershaft
03 Idler gearwheel of the first countershaft
04 Idler gearwheel of the first countershaft
05 Idler gearwheel of the first countershaft
06 Idler gearwheel of the second countershaft
07 Idler gearwheel of the second countershaft
08 Idler gearwheel of the second countershaft
09 Idler gearwheel of the second countershaft
10 Idler gearwheel of the second countershaft
11 Fixed gearwheel of the first countershaft as a drive output stage
12 Fixed gearwheel of the second countershaft as a drive output stage
13 Fixed gearwheel of the drive output shaft
14 Fixed gearwheel of the second transmission input shaft
15 Fixed gearwheel of the second transmission input shaft
16 Fixed gearwheel of the first transmission input shaft
17 Fixed gearwheel of the first transmission input shaft
18 Fixed gearwheel of the first transmission input shaft
19 Torsional vibration damper
K1 First clutch
K2 Second clutch
w_an Drive input shaft
w_ab Drive output shaft w_vorgelege1 First countershaft
w_vorgelege2 Second countershaft
A-B Dual action coupling device
C-D Dual action coupling device
C Single action coupling device
D-E Dual action coupling device
E Single action coupling device
F-G Dual action coupling device
H Single action coupling device
L Additional shifting element
i Transmission ratio
phi Transmission spread
1 First forward gear
2 Second forward gear
3 Third forward gear
4 Fourth forward gear
5 Fifth forward gear
6 Sixth forward gear
7 Seventh forward gear
8 Eighth forward gear
R1 First reverse gear
R2 Second reverse gear
w_zw Intermediate shaft
20 Idler gearwheel on the intermediate shaft

The invention claimed is:

1. A dual clutch transmission comprising:
first and second clutches (K1, K2) each having an input side connected to a drive input shaft (w_an) and an output side respectively connected to one of first and second transmission input shafts (w_K1, w_K2) being arranged coaxially with one another;
at least first and second countershafts (w_vorgelege1, w_vorgelege2) rotatably supporting toothed idler gearwheels (01, 02, 03, 04, 05, 06, 07, 08, 09, 10);
toothed fixed gearwheels (14, 15, 16, 17, 18) being connected in a rotationally fixed manner to one of the first and the second transmission input shafts (w_K1, w_K2), and each of the toothed fixed gearwheels (14, 15, 16, 17, 18) engaging at least one of the idler gearwheels (01, 02, 03, 04, 05, 06, 07, 08, 09, 10),
a plurality of coupling devices (A-B, C, C-D, D-E, E, F-G, H) for coupling at least one of the idler gearwheels (01, 02, 03, 04, 05, 06, 07, 08, 09, 10) in a rotationally fixed manner to one of the first and the second countershafts (w_vorgelege1, w_vorgelege2);
a first drive output gearwheel (11) being fixedly supported by the first countershaft (w_vorgelege1) and meshing with teeth of a drive output shaft (w_ab);
a second drive output gearwheel (12) being fixedly supported by the second countershaft (w_vorgelege2) and meshing with the teeth of the drive output shaft (w_ab);
at least one shifting element (L) for coupling the first and the second transmission input shafts (w_K1, w_K2), such that at least eight shift-under-load forward gears (1, 2, 3, 4, 5, 6, 7, 8) and at least one reverse gear (R1, R2) can be engaged; and
first, second, third, fourth and fifth wheel planes (01-06; 02-07; 03-08; 04-09, 04-17; 05-18, 18-10) being arranged such that the shifting element (L), for coupling the first and the second transmission input shafts (w_K1, w_K2), engages at least one shift-under-load winding gear.

2. The dual clutch transmission according to claim 1, wherein at least one of the shift-under-load and a non shift-under-load winding gear is at least one of an overdrive, an off-road gear, an intermediate gear and an additional reverse gears.

3. The dual clutch transmission according to claim 1, wherein at least a first forward gear (1) and the second reverse gear (R2) are shifted as shift-under-load winding gears.

4. The dual clutch transmission according to claim 1, wherein the first, second, third, fourth and fifth wheel planes (01-06; 02-07; 03-08; 04-17; 05-18) comprise two fixed gearwheels (14, 15) on the second transmission input shaft (w_K2), three fixed gearwheels (16, 17, 18) on the first transmission input shaft (w_K1), five idler gearwheels (01, 02, 03, 04, 05) on the first countershaft (w_vorgelege1) and three idler gearwheels (06, 07, 08) on the second countershaft (w_vorgelege2).

5. The dual clutch transmission according to claim 1, wherein in the first wheel plane (01-06), a fixed gearwheel (14) of the second transmission input shaft (w_K2) meshes with an idler gearwheel (01) of the first countershaft (w_vorgelege1) and an idler gearwheel (07) of the second countershaft (w_vorgelege2).

6. The dual clutch transmission according to claim 1, wherein in the second wheel plane (02-07), a fixed gearwheel (15) of the second transmission input shaft (w_K2) meshes with an idler gearwheel (02) of the first countershaft (w_vorgelege1) and an idler gearwheel (07) of the second countershaft (w_vorgelege2).

7. The dual clutch transmission according to claim 1, wherein in the third wheel plane (03-08), a fixed gearwheel (16) of the first transmission input shaft (w_K1) meshes with an idler gearwheel (03) of the first countershaft (w_vorgelege1) and a further idler gearwheel (20) meshes with the fixed gearwheel (16) of the first transmission input shaft (w_K1) and an idler gearwheel (08) of the second countershaft (w_vorgelege2).

8. The dual clutch transmission according to claim 7, wherein the further idler gearwheel (20), that meshes with the idler gearwheel (08) of the second countershaft (w_vorgelege2), is supported by an intermediate shaft (w_zw).

9. The dual clutch transmission according to claim 1, wherein an idler gearwheel (03) of the first countershaft (w_vorgelege1) meshes with an idler gearwheel (08) of the second countershaft (w_vorgelege2).

10. The dual clutch transmission according to claim 7, wherein the idler gearwheel (03, 20) which meshes with the idler gearwheel (08) of the second countershaft (w_vorgelege2) is a step wheel.

11. The dual clutch transmission according to claim 1, wherein in the fourth wheel plane (04-17), a fixed gearwheel (17) of the first transmission input shaft (w_K1) meshes with an idler gearwheel (04) of the first countershaft (w_vorgelege1).

12. The dual clutch transmission according to claim 1, wherein in the fifth wheel plane (05-18), a fixed gearwheel (18) of the first transmission input shaft (w_K1) meshes with an idler gearwheel (05) of the first countershaft (w_vorgelege1).

13. The dual clutch transmission according to claim 1, wherein a dual action coupling device (A-B) is arranged on the first countershaft (w_vorgelege1) between the first wheel plane (01-06) and the second wheel plane (02-07).

14. The dual clutch transmission according to claim 1, wherein a dual action coupling device (C-D) is arranged on the first countershaft (w_vorgelege1) between the third wheel plane (03-08) and the fourth wheel plane (04-17).

15. The dual clutch transmission according to claim 1, wherein a single action coupling device (E) is arranged on the first countershaft (w_vorgelege1) adjacent the fifth wheel plane (05-18).

16. The dual clutch transmission according to claim 1, wherein a dual action coupling device (F-G) is arranged on the second countershaft (w_vorgelege2) between the first wheel plane (01-06) and the second wheel plane (02-07).

17. The dual clutch transmission according to claim 1, wherein a single action coupling device (H) is arranged on the second countershaft (w_vorgelege2) adjacent the third wheel plane (03-08).

18. The dual clutch transmission according to claim 1, wherein the shifting element (L) is arranged on the first countershaft (w_vorgelege1) between the second wheel plane (02-07) and the third wheel plane (03-08).

19. The dual clutch transmission according to claim 1, wherein the dual clutch transmission comprises first and second shift-under-load winding gears,
- a first forward gear (1) is engaged as the first shift-under-load winding gear by engagement of the first clutch (K1), a fourth coupling device (F-G) biased in a second direction (G) direction and activation of the shifting element (L);
- a second forward gear (2) is engaged by engagement of the second clutch (K2) and the fourth coupling device (F-G) biased in the second direction (G) direction;
- a third forward gear (3) is engaged by engagement of the first clutch (K1) and a second coupling device (C-D) biased in a first direction (C) direction;
- a fourth forward gear (4) is engaged by engagement of the second clutch (K2) and a first coupling device (A-B) biased in a second direction (B) direction;
- a fifth forward gear (5) is engaged by engagement of the first clutch (K1) and a third coupling device (E);
- a sixth forward gear (6) is engaged by engagement of the second clutch (K2) and the fourth coupling device (F-G) biased in a first direction (F) direction;
- a seventh forward gear (7) is engaged by engagement of the first clutch (K1) and the second coupling device (C-D) biased in a second direction (D);
- an eighth forward gear (8) is engaged by engagement of the second clutch (K2) and the first coupling device (A-B) biased in a first direction (A) direction;
- a first reverse gear (R1) is engaged by engagement of the first clutch (K1) and a fifth coupling device (H); and
- a second reverse gear (R2) is engaged as the second shift-under-load winding gear by engagement of the second clutch (K2), the fifth coupling device (H) and activation of the shifting element (L).

20. The dual clutch transmission according to claim 1, wherein at least a first reverse gear (R1) and a second reverse gear (R2) are engaged as winding gears.

21. The dual clutch transmission according to claim 20, wherein the first, second, third, fourth and fifth wheel planes (01-06, 02-07, 03-08, 04-09, 18-10) comprise two fixed gearwheels (14, 15) on the second transmission input shaft (w_K2) and three fixed gearwheels (16, 17, 18) on the first transmission input shaft (w_K1), four idler gearwheels (01, 02, 03, 04) on the first countershaft (w_vorgelege1) and five idler gearwheels (06, 07, 08, 09, 10) on the second countershaft (w_vorgelege2).

22. The dual clutch transmission according to claim 20, wherein in the first wheel plane (01-06), a fixed gearwheel (14) of the second transmission input shaft (w_K2) meshes with an idler gearwheel (01) of the first countershaft (w_vorgelege1) and an idler gearwheel (06) of the second countershaft (w_vorgelege2).

23. The dual clutch transmission according to claim 20, wherein in the second wheel plane (02-07), a fixed gearwheel (15) of the second transmission input shaft (w_K2) meshes with an idler gearwheel (02) of the first countershaft (w_vorgelege1) and an idler gearwheel (07) of the second countershaft (w_vorgelege2).

24. The dual clutch transmission according to claim 20, wherein in the third wheel plane (03-08), a fixed gearwheel (16) of the first transmission input shaft (w_K1) meshes with an idler gearwheel (08) of the second countershaft (w_vorgelege2) and a further idler gearwheel (20) meshes with the fixed gearwheel (16) of the first transmission input shaft (w_K1) and an idler gearwheel (03) of the first countershaft (w_vorgelege1).

25. The dual clutch transmission according to claim 24, wherein the further idler gearwheel (20), which meshes with the idler gearwheel (03) of the first countershaft (w_vorgelege1), is supported on an intermediate shaft (w_zw).

26. The dual clutch transmission according to claim 20, wherein the idler gearwheel (03) of the first countershaft (w_vorgelege1) meshes with an idler gearwheel (08) of the second countershaft (w_vorgelege2).

27. The dual clutch transmission according to claim 24, wherein the further idler gearwheel (08, 20) which meshes with the idler gearwheel (03) of the first countershaft (w_vorgelege1) is a step wheel.

28. The dual clutch transmission according to claim 20, wherein in the fourth wheel plane (04-09), a fixed gearwheel (17) of the first transmission input shaft (w_K1) meshes with an idler gearwheel (04) of the first countershaft (w_vorgelege1) and an idler gearwheel (09) of the second countershaft (w_vorgelege2).

29. The dual clutch transmission according to claim 20, wherein in the fifth wheel plane (18-10), a fixed gearwheel (18) of the first transmission input shaft (w_K1) meshes with an idler gearwheel (10) of the first countershaft (w_vorgelege1).

30. The dual clutch transmission according to claim 20, wherein a dual action coupling device (A-B) is arranged on the first countershaft (w_vorgelege1) between the first wheel plane (01-06) and the second wheel plane (02-07).

31. The dual clutch transmission according to claim 20, wherein a single action coupling device (C) is arranged on the first countershaft (w_vorgelege1) between the third wheel plane (03-08) and the fourth wheel plane (04-09).

32. The dual clutch transmission according to claim 20, wherein a dual action coupling device (D-E) is arranged on the second countershaft (w_vorgelege2) between the first wheel plane (01-06) and the second wheel plane (02-07).

33. The dual clutch transmission according to claim 20, wherein a dual action coupling device (F-G) is arranged on the second countershaft (w_vorgelege2) between the third wheel plane (03-08) and the fourth wheel plane (04-09).

34. The dual clutch transmission according to claim 20, wherein a single action coupling device (H) is arranged on the second countershaft (w_vorgelege2) between the fourth wheel plane (04-09) and the fifth wheel plane (18-10).

35. The dual clutch transmission according to claim 20, wherein the shifting element (L) is arranged on the first countershaft (w_vorgelege1) between the second wheel plane (02-07) and the third wheel plane (03-08).

36. The dual clutch transmission according to claim 35, wherein a coupling device (C) arranged on the first countershaft (w_vorgelege1), between the third wheel plane (03-08) and the fourth wheel plane (04-09), and the shifting element (L) are single action coupling devices.

37. The dual clutch transmission according to claim 20, wherein the dual clutch transmission comprises first and second shift-under-load winding gears, a first forward gear (1) is engaged by engagement of the first clutch (K1) and a fourth coupling device (F-G) biased in a first direction (F);

a second forward gear (2) is engaged by engagement of the second clutch (K2) and third coupling device (D-E) biased in a second direction (E);

a third forward gear (3) is engaged by engagement of the first clutch (K1) and a fifth coupling device (H) of the second counters haft (w_vorgelege2);

a fourth forward gear (4) is engaged by engagement of the second clutch (K2) and a first coupling device (A-B) biased in a second direction (B);

a fifth forward gear (5) is engaged by engagement of the first clutch (K1) and the fourth coupling device (F-G) biased in a second direction (G);

a sixth forward gear (6) is engaged by engagement of the second clutch (K2) and the third coupling device (D-E) biased in a first direction (D);

a seventh forward gear (7) is engaged by engagement of the first clutch (K1) and second coupling device (C);

an eighth forward gear (8) is engaged by engagement of the second clutch (K2) and the first coupling device (A-B) biased in a first direction (A);

a first reverse gear (R1) is engaged as the first shift-under-load winding gear by engagement of the first clutch (K1), the third coupling device (D-E) biased in the second direction (E) and activating the shifting element (L); and a second reverse gear (R2) is engaged as the second shift-under-load winding gear by engagement of the second clutch (K2), the fourth coupling device (F-G) biased in the first direction (F) and activating the shifting element (L).

38. The dual clutch transmission according to claim 1, wherein the drive input shaft (w_an) and the drive output shaft (w_ab) are at an angle with respect to one another.

39. The dual clutch transmission according to claim 1, wherein an integrated drive output stage comprises a fixed gearwheel (13) supported by a drive output shaft (w_ab) which meshes with a fixed gearwheel (11) of the first countershaft (w_vorgelege1) and a fixed gearwheel (12) of the second countershaft (w_vorgelege2).

40. The dual clutch transmission according to claim 1, wherein lower forward gears and the at least one reverse gear are each engaged by one of the first and the second clutches (K1, K2) which is one of a starting clutch and a shifting clutch.

* * * * *